US006327963B1

United States Patent
Jensen et al.

(10) Patent No.: US 6,327,963 B1
(45) Date of Patent: Dec. 11, 2001

(54) PISTON OR PLUNGER AND A METHOD FOR MAKING THE SAME

(75) Inventors: Leo Jensen, Ålsgårde; Agge Jan Tonndorff, Virum, both of (DK)

(73) Assignee: W.S. Shamban Europa A/S, Helsingor (DK)

(*) Notice: Subject to any disclaimer, the term of this patent is extended or adjusted under 35 U.S.C. 154(b) by 0 days.

(21) Appl. No.: 09/454,843

(22) Filed: Dec. 6, 1999

Related U.S. Application Data
(60) Provisional application No. 60/120,661, filed on Feb. 19, 1999.

(30) Foreign Application Priority Data

Dec. 4, 1998 (DK) .............................................. 1998 01599

(51) Int. Cl.[7] ........................................................ F16J 9/00
(52) U.S. Cl. ............................................... 92/244; 92/249
(58) Field of Search ............................. 92/172, 242, 243, 92/244, 249

(56) References Cited

U.S. PATENT DOCUMENTS

| 4,372,702 | * | 2/1983 | Devaud | 92/172 |
| 5,345,860 | * | 9/1994 | Bowell | 92/240 |
| 5,520,092 | * | 5/1996 | Iida et al. | 92/240 |
| 5,794,517 | * | 8/1998 | Emig | 92/244 |

FOREIGN PATENT DOCUMENTS

| 61082072 | 4/1986 | (JP) | F16J/9/28 |
| 61112838 | 5/1986 | (JP) | F16F/9/32 |
| 61116136 | 6/1986 | (JP) | F16F/9/32 |
| 62200045 | 9/1987 | (JP) | F16F/9/32 |
| 62231725 | 10/1987 | (JP) | B29C/63/18 |
| 07332423 | 12/1995 | (JP) | F16F/9/32 |
| 10089479 | 4/1998 | (JP) | F16J/9/28 |

* cited by examiner

Primary Examiner—Edward K. Look
Assistant Examiner—Thomas E Lazo
(74) Attorney, Agent, or Firm—Klein & Szekeres LLP

(57) ABSTRACT

A piston or plunger is made by passing an annular sealing member blank around a piston body and by moving it towards a central outer cylindrical surface part of the piston body defined between first and second circular edges. The sealing member blank is deformed into tight engagement with the central outer cylindrical surface part and into grooves or depressions formed therein. In this manner, a tubular sealing member, which extends axially along the central outer surface part, and which has opposite first and second ends extending beyond the first and second circular edges, respectively, is formed. Thereby both of these opposite end portions of the tubular sealing member may function as sealing lips.

24 Claims, 1 Drawing Sheet

PISTON OR PLUNGER AND A METHOD FOR MAKING THE SAME

CROSS-REFERENCE TO RELATED APPLICATION

This application claims benefit, under 35 U.S.C. Section 119(e), of Provisional Application No. 60/120,661 filed Feb. 19, 1999.

FIELD OF THE INVENTION

The present invention relates to a method of making a piston or plunger which comprises a piston body defining a central outer cylindrical surface part thereon with a maximum outer diameter and extending between first and second circular edges, and a sealing member made from a deformable material and being in tight engagement with said cylindrical surface part. Such pistons or plungers may co-operate with hydraulic or pneumatic cylinders or may form part of a kind of a piston pump. As an example, the piston or plunger of this type may be used in schock absorbers for cars or other vehicles.

1. Description of Prior Art

It is known to produce such pistons or plungers by applying a disc-shaped angular sealing member blank to the piston body and by deforming the blank into a tubular sealing member being in close contact with the outer surface of the piston body. The sealing member blank is usually applied to the piston body by means of a female mandrel having an inner diameter slightly exceeding the maximum outer diameter of the peripheral outer surface of the piston body, and the tubular sealing member is positioned on the piston body by having the trailing edge of the sealing member blank being deformed, received in an annular channel or groove formed in the peripheral outer surface of the piston body. The leading edge of the tubular sealing member extends radially from the peripheral outer surface of the piston body and defines a sealing lip.

2. General Description of the Invention

The present invention provides a method of producing a piston or plunger of the above type having a sealing lip at opposite ends of the sealing member. Thus, the present invention provides a method comprising forming the piston body, forming peripherally extending, axially spaced grooves or depressions in the central cylindrical surface part of the piston body, passing and annular sealing member blank with an inner diameter being substantially smaller than the maximum diameter of the central outer cylindrical surface part around a first end of said piston body and moving it towards said first circular edge, and deforming the sealing member blank into tight engagement with the central outer cylindrical surface part and into the grooves or depressions formed therein so as to form a tubular sealing member extending axially along said central outer surface part and having opposite first and second ends extending beyond said first and second circular edges, respectively, whereby said opposite end portions of the tubular sealing member may function as sealing lips.

The piston body may have end portions extending from the central outer cylindrical surface part, and these end portions may have an outer diameter being substantially the same as that of the central cylindrical surface part. In the preferred embodiment, however, the piston body has stepped configuration with opposite end portions extending from said central outer cylindrical surface part, and the outer diameter of each of the end portions are then smaller than the diameter of the central outer cylindrical surface part so as to define said first and second edges there between. It is important that the tubular sealing member is positioned correctly in relation to the piston body. This may, for example, be obtained by having the said first end or trailing end of the sealing member temporarily received or located in an annular groove formed in the outer peripheral surface of the piston body axially spaced from the adjacent first end. This means, that such groove may be defined in an end portion of the piston body which may have a slightly smaller maximum outer diameter than the central cylindrical surface part.

The annular grooves or depressions formed in the central outer peripheral outer surface part of the piston body receives sealing member material therein when the sealing member blank is being deformed whereby an interlocking engagement between the sealing member and the piston body is obtained. It has been found that the formation of the first end of the tubular sealing member into a sealing lip is facilitated when the grooves or depressions in the central outer peripheral surface of the piston body are such that a first axial spacing of said first circular edge from the adjacent peripherally extending groove or depression in the central outer peripheral surface part of the piston body substantially exceeds a second axial spacing of the second circular edge of the piston body from the adjacent groove or depression in the central part. Usually the said first axial spacing should exceed 3 mm and, preferably, the first axial spacing is at least twice the second axial space.

The annular sealing member blank may, for example, be a disk or tube, or it may have any other suitable form, such as a strip or band or a piece of sheet material, which—in an annular shape—is applied to the piston body. When applying the sealing member blank to the piston body by plastic deformation of the sealing member blank the piston body and/or the sealing member blank may be heated to a temperature, usually in the range of 20–100° C. Furthermore, when the sealing member blank has been transformed into a tubular sealing member, the piston or plunger thus produced may be exposed to a heat treatment so as to calibrate the effective outer diameter of the piston or plunger and so as to cause at least one of the opposite ends of the tubular sealing member to move radially outwardly to form said sealing lips. Doing the heat treatment last mentioned the piston or plunger may be heated to a temperature within the range 150–260° C. The annular sealing member blank may be substantially flat and may be made from sheet material, for example by punching. Preferably, however, the sealing member blank is made by slicing a tubular member.

The sealing member blank may be applied to the piston body in any suitable manner. Preferably, however, the sealing member blank is passed on to the piston body via a tapered or frusto-conical member having its wide end positioned in abutting engagement with one end of the piston body. Thereafter, the sealing member blank may be exposed to radially inwardly directed forces so as to deform the blank into engagement with the central outer peripheral surface part of the piston body. In the preferred embodiment the sealing member blank is deformed by means of a compression tool having an opening defined therein with a diameter exceeding the maximum outer diameter of the central outer cylindrical surface part of the piston body, and the piston body with the sealing member blank arranged thereon may then be moved axially in relation to the compression tool through the opening thereof so as to deform the sealing member blank into the grooves or depressions of the piston body.

The present invention further provides a piston or plunger comprising a piston body defining an outer cylindrical surface part thereon extending between first and second axially spaced circular edges of the piston body, peripherally extending, mutually axially spaced grooves or depressions being formed in the outer cylindrical surface, and an annular sealing member made from a deformable material being deformed into tight engagement with said peripheral surface part, the sealing member having opposite first and second ends extending beyond said first and second circular edges respectively, of the piston body, so as to define opposite end portions of the tubular sealing member functioning as sealing lips.

According to a further aspect the present invention provides a piston body for use in a piston or plunger of the type described above, said piston body defining an outer cylindrical surface part thereon extending between first and second axially spaced circular edges of the piston body, peripherally extending, mutually axially spaced grooves or depressions being formed in the outer cylindrical surface for retaining thereon an annular sealing member made from a deformable material, said grooves or depressions in the outer peripheral surface part of the piston body being positioned such that a first axial spacing of said first edge of the piston body from the adjacent peripherally extending groove or depression substantially exceeds a second axial spacing of the second edge of the piston body from the adjacent groove or depression.

BRIEF DESCRIPTION OF THE DRAWINGS

The invention will be now be further described with reference to the drawings, wherein.

DESCRIPTION OF A PREFERRED EMBODIMENT

Figure 1:
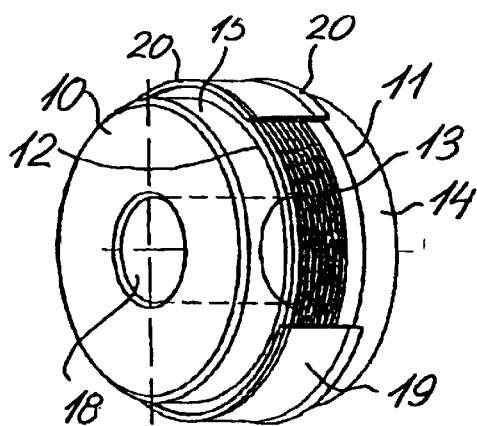
FIG. 1 is a perspective and partially sectional view of an embodiment of the piston or plunger according to the invention.
Figure 2:
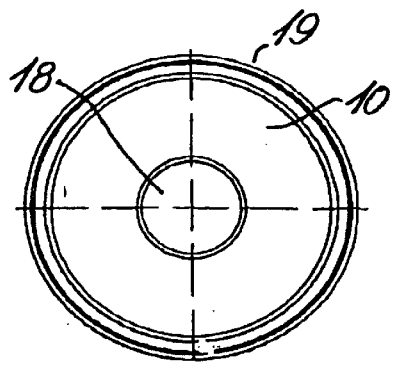
FIG. 2 is an end view of the piston shown in FIG. 1.
Figure 3:
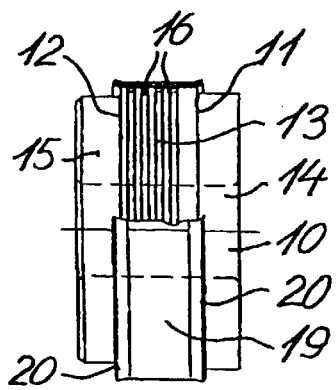
FIG. 3 is a side and partially sectional view of the piston shown in FIGS. 1 and 2.

The piston or plunger illustrated in FIGS. 1–3 and 5 comprises a piston body 10 having an outer peripheral surface which by means of first and second circular edges 11 and 12 are divided into a central part 13 and a pair of opposite end parts 14 and 15, respectively. A number of annular grooves or channels 16 are formed in the central part 13 of the outer peripheral surface, and an annular channel or groove 17 (FIGS. 4 and 5) may be formed in the first end part of the piston body 10. The maximum outer diameter of the end part 14 and 15 is preferably slightly smaller than the maximum outer diameter of the central part 13. The piston body 10 may be provided with a central bore 18 for receiving a piston rod or the like, not shown. The piston body 10 is preferably made from metal by casting or pressure moulding and sintering. Alternatively, the piston body may be made from hard plastic or another suitable material.

The piston or plunger further comprises a tubular sealing member 19 defining radially extending sealing lips 20 at opposite ends. The sealing member 19 is preferably made from polytetrafluorethylene, which may be mixed with further material, such as particulate or powdered metal, for example bronze. The material of the sealing member extends into the annular grooves 16 and is in contact with oppositely directed, radially extending annular shoulders defining the edges 11 and 12.

Figure 4:
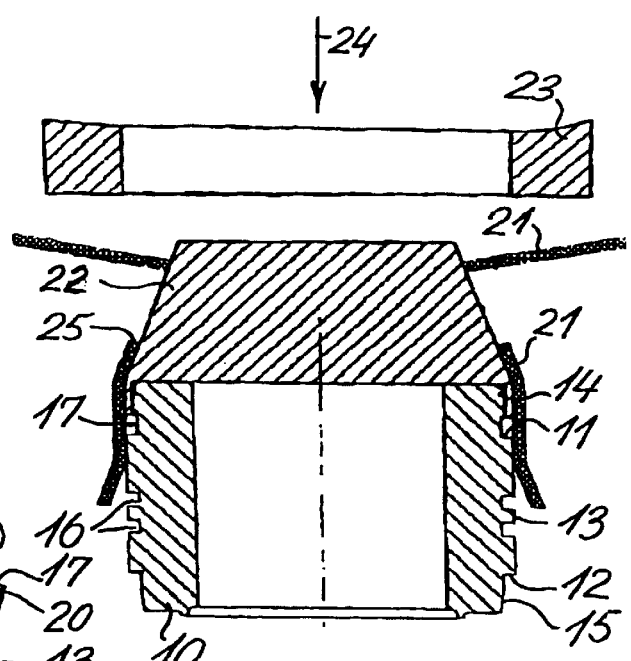
FIG. 4 illustrates a process for applying a sealing member blank to a piston body.
Figure 5:
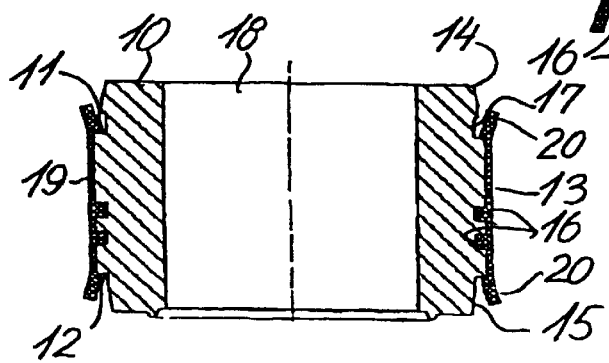
FIG. 5 is an axial sectional view of the completed piston or plunger.

The sealing member 19 may be mounted on the piston body 10 in a manner known per se and as illustrated in FIG. 4. An annular, disc-shaped sealing member blank 21 which may, for example, be made from polytetrafluorethylene, is placed around the narrow and of a frusto-conical mounting tool 22. The wider end of the mounting tool 22 has an outer diameter corresponding to the maximum outer diameter of the central part 13 of the outer peripheral surface of the piston body 10 and is placed in abutting engagement with the first end part 14 of the piston body as shown in FIG. 4.

An annular, disc-like female mandrel 23 having an inner diameter slightly exceeding the maximum outer diameter of the central part 13 is moved axially around the mounting tool 22 and the piston body 10 as illustrated by an arrow 24 in FIG. 4. Thereby, the disc-like sealing member blank 21 is converted into a tubular sheet by plastic deformation. When the mandrel 23 has been moved axially along the combined total axial length of the mounting tool 22 and the piston body 10, the blank 21 has been converted into the tubular sealing member 19 shown in FIG. 5.

When the disc-like sealing member blank 21 is converted into a tubular form as illustrated in FIG. 4, the trailing edge 25 is eventually moved to and received in the channel or groove 17. However, when the piston body 10 and the tubular sealing member 19 mounted thereon is later exposed to a heat treatment in a known manner, the opposite ends of the tubular sealing member are moved radially outwardly so as to form the sealing lips. Such outward movement of the trailing edge 25 from the channel or groove 17 is assisted by the fact that the axial spacing between the first circular edge 11 and the adjacent groove or channel 16 substantially exceeds the axial spacing between the second circular edge 12 and the adjacent groove or channel 16.

What is claimed is:

1. A method of making a piston or plunger which comprises a piston body defining a central outer cylindrical surface part thereon with a maximum outer diameter and extending between first and second circular edges, and a sealing member made from a deformable material and being in tight engagement with said central outer cylindrical surface part, said method comprising:

forming the piston body, forming peripherally extending, axially spaced grooves or depressions in the central outer cylindrical surface part of the piston body, passing an annular sealing member blank with an inner diameter being substantially smaller than the maximum diameter of the central outer cylindrical surface part around a first end of said piston body and moving it towards said first circular edge, the tubular sealing member being positioned on the piston body by locating the first end of the sealing member in an annular groove formed in the central outer cylindrical surface part of the piston body axially spaced from the adjacent first end, and deforming the sealing member blank into tight engagement with the central outer cylindrical surface part and into the grooves or depressions formed therein so as to form a tubular sealing member extending axially along said central outer cylindrical surface part and having opposite first and second ends extending beyond said first and second circular edges, respectively, whereby said opposite end portions of the tubular sealing member may function as sealing lips.

2. A method according to claim 1, wherein the piston body has a stepped configuration with opposite end portions extending from said central outer cylindrical surface part, the outer diameter of each of the end portions being smaller than the diameter of the central outer cylindrical surface part so as to define said first and second edges therebetween.

3. A method according to claim 1, wherein the grooves or depressions in the central outer cylindrical surface part of the piston body are such that a first axial spacing of said first circular edge from the adjacent peripherally extending groove or depression in the central part substantially exceeds a second axial spacing of the second circular edge of the piston body from the adjacent groove or depression in the central part.

4. A method according to claim 3, wherein the first axial spacing is at least twice the second axial spacing.

5. A method according to claim 1, wherein the piston body and the sealing member applied thereto is exposed to a heat treatment so as to cause at least one of the opposite ends of the tubular sealing member to move radially outwardly.

6. A method according to claim 1, wherein the annular sealing member blank is substantially flat and is made from sheet material.

7. A method according to claim 1, wherein the sealing member blank is passed onto the piston body via a tapered member having its wide end positioned in abutting engagement with one end of the piston body.

8. A method according to claim 1, wherein the sealing member blank is exposed to radially inwardly directed forces so as to deform the blank into engagement with the central outer cylindrical surface part of the piston body.

9. A method according to claim 1, wherein the sealing member blank is deformed by means of a compression tool having an opening defined therein with a diameter exceeding the maximum outer diameter of the central outer cylindrical surface part of the piston body, the piston body with the sealing member blank arranged thereon being moved axially in relation to the compression tool through the opening thereof, so as to deform the sealing member blank into the grooves or depressions of the piston body.

10. A method of making a piston or plunger which comprises a piston body defining a central outer cylindrical surface part thereon with a maximum outer diameter and extending between first and second circular edges, and a sealing member made from a deformable material and being in tight engagement with said central outer cylindrical surface part, said method comprising:
   forming the piston body,
   forming peripherally extending, axially spaced grooves or depressions in the central outer cylindrical surface part of the piston body, the grooves or depressions in the central outer cylindrical surface part of the piston body being such that a first axial spacing of said first circular edge from the adjacent peripherally extending groove or depression in the central part substantially exceeds a second axial spacing of the second circular edge of the piston body from the adjacent groove or depression in the central part
   passing an annular sealing member blank with an inner diameter being substantially smaller than the maximum diameter of the central outer cylindrical surface part around a first end of said piston body and moving it towards said first circular edge, and
   deforming the sealing member blank into tight engagement with the central outer cylindrical surface part and into the grooves or depressions formed therein so as to form a tubular sealing member extending axially along said central outer cylindrical surface part and having opposite first and second ends extending beyond said first and second circular edges, respectively, whereby said opposite end portions of the tubular sealing member may function as sealing lips.

11. A method according to claim 10, wherein the tubular sealing member is positioned on the piston body by locating the first end of the sealing member in an annular groove formed in the central outer cylindrical surface part of the piston body axially spaced from the adjacent first end.

12. A method according to claim 10, wherein the first axial spacing is at least twice the second axial spacing.

13. A method according to claim 10, wherein the piston body has a stepped configuration with opposite end portions extending from said central outer cylindrical surface part, the outer diameter of each of the end portions being smaller than the diameter of the central outer cylindrical surface part so as to define said first and second edges therebetween.

14. A method according to claim 10, wherein the piston body and the sealing member applied thereto is exposed to a heat treatment so as to cause at least one of the opposite ends of the tubular sealing member to move radially outwardly.

15. A method according to claim 10, wherein the annular sealing member blank is substantially flat and is made from sheet material.

16. A method according to claim 10, wherein the sealing member blank is passed onto the piston body via a tapered member having its wide end positioned in abutting engagement with one end of the piston body.

17. A method according to claim 10, wherein the sealing member blank is exposed to radially inwardly directed forces so as to deform the blank into engagement with the central outer cylindrical surface part of the piston body.

18. A method according to claim 10, wherein the sealing member blank is deformed by means of a compression tool having an opening defined therein with a diameter exceeding the maximum outer diameter of the central outer cylindrical surface part of the piston body, the piston body with the sealing member blank arranged thereon being moved axially in relation to the compression tool through the opening thereof, so as to deform the sealing member blank into the grooves or depressions of the piston body.

19. A piston or plunger comprising
   a piston body defining an outer cylindrical surface part thereon extending between first and second axially spaced circular edges of the piston body, peripherally extending, mutually axially spaced grooves or depressions being formed in the outer cylindrical surface, the grooves or depressions in the outer cylindrical surface part of the piston body being positioned such that a first axial spacing of said first edge of the piston body from the adjacent peripherally extending groove or depression substantially exceeds a second axial spacing of the second edge of the piston body from the adjacent groove or depression, and
   an annular sealing member made from a deformable material being deformed into tight engagement with said cylindrical surface part, the sealing member having opposite first and second bends extending beyond said first and second circular edges, respectively, of the piston body, so as to define opposite end portions of the tubular sealing member functioning as sealing lips.

20. A piston or plunger according to claim 19, wherein the first axial spacing is at least twice the second axial spacing.

21. A piston or plunger according to claim 20, wherein the piston body has a stepped configuration with opposite end portions extending from an intermediate portion defining said outer cylindrical surface part, the diameter of the intermediate portion exceeding the diameter of the end portions so as to define said first and second edges there between.

22. A piston body for use in a piston or plunger of the type comprising a piston and an annular sealing member made from a deformable material being deformed into tight engagement with an outer cylindrical surface part of the piston body extending between first and second axially spaced circular edges, the sealing member having opposite first and second ends extending beyond said first and second circular edges, respectively, of the piston body so as to define opposite end portions of the tubular sealing member functioning as sealing lips, said piston body defining an outer cylindrical surface part thereon extending between first and second axially spaced circular edges of the piston body, peripherally extending, mutually axially spaced grooves or depressions being formed in the outer cylindrical surface part for retaining thereon an annular sealing member made from a deformable material, said grooves or depressions in the outer peripheral surface part of the piston body being positioning such that a first axial spacing of said first edge of the piston body from the adjacent peripherally extending groove or depression substantially exceeds a second axial spacing of the second edge of the piston body from the adjacent groove or depression.

23. A piston body according to claim 22, wherein the piston body has a stepped configuration with opposite end portions extending from an intermediate portion defining said cylindrical surface part, the diameter of the intermediate portion exceeding the diameter of the end portions so as to define said first and second edges there between.

24. A piston body according to claim 23, wherein the end portion of the piston body adjacent to said first circular edge has an annular depression or groove formed therein.

* * * * *